(12) United States Patent
Nordman

(10) Patent No.: US 9,352,822 B2
(45) Date of Patent: May 31, 2016

(54) BONDED COMPOSITE AIRFOIL

(75) Inventor: Paul Stanley Nordman, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 1198 days.

(21) Appl. No.: 13/483,964

(22) Filed: May 30, 2012

(65) Prior Publication Data

US 2013/0320142 A1 Dec. 5, 2013

(51) Int. Cl.
*B64C 3/20* (2006.01)
*B64C 3/26* (2006.01)
*B29C 65/48* (2006.01)
*B29C 65/00* (2006.01)
*B29L 31/30* (2006.01)

(52) U.S. Cl.
CPC .............. *B64C 3/20* (2013.01); *B29C 65/483* (2013.01); *B29C 66/1162* (2013.01); *B29C 66/1282* (2013.01); *B29C 66/1284* (2013.01); *B29C 66/1286* (2013.01); *B29C 66/12821* (2013.01); *B29C 66/524* (2013.01); *B29C 66/543* (2013.01); *B29C 66/723* (2013.01); *B29C 66/72141* (2013.01); *B29C 66/72525* (2013.01); *B29C 66/73756* (2013.01); *B64C 3/26* (2013.01); *B29C 65/4835* (2013.01); *B29L 2031/3085* (2013.01); *Y10T 156/10* (2015.01)

(58) Field of Classification Search
CPC ................................. B64C 3/20; B64C 3/26
USPC .................... 244/123.5, 123.1, 124
See application file for complete search history.

(56) References Cited

U.S. PATENT DOCUMENTS

| 2,432,396 | A | * | 12/1947 | Earhart | 244/124 |
| 2,482,798 | A | | 9/1949 | Rheinfrank, Jr. et al. | |
| 3,072,225 | A | | 1/1963 | Cremer et al. | |
| 3,910,531 | A | | 10/1975 | Leomand | |
| 4,565,595 | A | | 1/1986 | Whitener | |
| 4,671,470 | A | * | 6/1987 | Jonas | 244/119 |
| 6,116,539 | A | * | 9/2000 | Williams et al. | 244/46 |
| 7,056,270 | B2 | * | 6/2006 | Mellott | 493/51 |
| 7,182,293 | B2 | * | 2/2007 | Sarh | 244/123.7 |
| 8,070,100 | B2 | * | 12/2011 | Douglas | 244/123.1 |
| 8,104,714 | B2 | | 1/2012 | Brown et al. | |
| 9,016,551 | B2 | * | 4/2015 | Kirkwood et al. | 228/173.6 |
| 2008/0105661 | A1 | | 5/2008 | Kirkwood et al. | |
| 2008/0128553 | A1 | * | 6/2008 | Brown et al. | 244/124 |
| 2010/0006702 | A1 | | 1/2010 | Fogarty et al. | |
| 2010/0077690 | A1 | * | 4/2010 | Durand | 52/578 |
| 2010/0155528 | A1 | * | 6/2010 | Balsa Gonzalez et al. | 244/87 |

FOREIGN PATENT DOCUMENTS

| JP | H08290497 A | 11/1996 |
| WO | WO8701354 A1 | 3/1987 |
| WO | WO2008010198 A1 | 1/2008 |

OTHER PUBLICATIONS

Stephens et al., "Final Report on Development of Advanced Composite Vertical Stabilizer for DC-10 Transport Aircraft," NASA Contractor Report 178014, McDonnell Douglas Corporation, May 1988, 183 Pages.

(Continued)

*Primary Examiner* — Justin Benedik
(74) *Attorney, Agent, or Firm* — Yee & Associates, P.C.

(57) ABSTRACT

An airfoil includes at least one precured composite spar having a web and at least one flange integrated with an end of the web. A precured composite skin is attached to the spar by adhesive bonding the skin to the flange.

17 Claims, 10 Drawing Sheets

(56) References Cited

OTHER PUBLICATIONS

Canadian Intellectual Property Office Examination Search Report, dated Apr. 7, 2015, regarding Application No. 2,808,770, 6 pages.

Extended European Search Report, dated May 19, 2015, regarding Application No. 13169875.5, 6 pages.

* cited by examiner

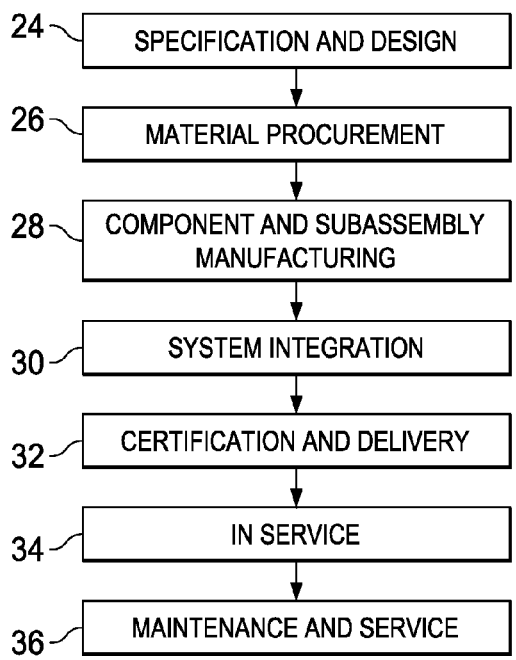
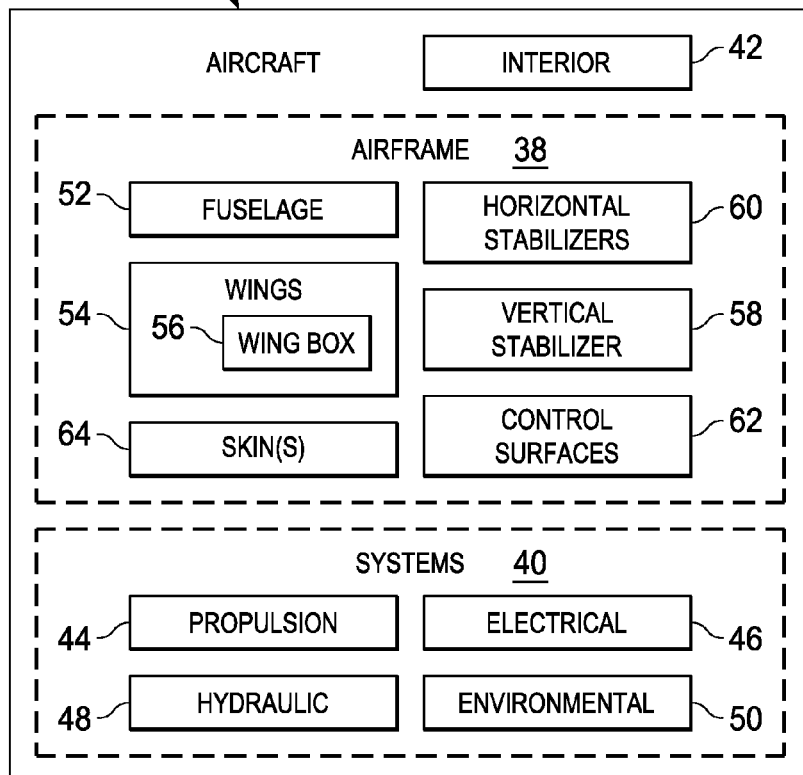

BONDED COMPOSITE AIRFOIL

BACKGROUND INFORMATION

1. Field

The present disclosure generally relates to airfoils, such as a wing box for an aircraft, and deals more particularly with an airfoil construction having a composite outer skin bonded to wing spars.

2. Background

Aircraft wings and/or control surfaces may employ a framework of spars, ribs and stringers that are covered with an outer skin. The spars may carry a majority of the wing load while the ribs both stiffen the wing and provide an airfoil shape for the wing skin. In the case of metal wing constructions, metal structures may be attached to the metal spars using fastener joints. However, the use of fastener joints may present difficulties in composite spar wing and control surface designs, in part because composites may have a lower bearing capacity than metals. Accordingly, composite wing constructions using fasteners may require reinforcements to increase their fastener bearing capacity in joint areas. The need to add reinforcements in the wing may reduce airfoil performance, add undesired weight to the aircraft and/or increase manufacturing costs.

Accordingly, there is a need for bonded joining of a composite wing and/or control surface structure and related fabrication method that may reduce or eliminate the need for fasteners in joints between a wing spar and a connected structures skin. There is also a need for an airfoil design such as a wing box that simplifies fabrication of wing components and allows pre-cured composite wing skins to be attached to pre-cured composite spars using adhesive bonding techniques in a secondary bonding operation.

SUMMARY

The disclosed embodiments provide an airfoil, such as an airplane wing box or control surface, and a related fabrication method that allows precured composite sandwich panel skins to be adhesively bonded to precured composite sandwich spars in a secondary bonding operation, thereby reducing or obviating the need for fastened joints between the skins and the spars. Use of composite sandwich panel skins and spars provides the airfoil with the required stiffness while reducing part count, complexity and weight. Precuring the wing skins and wing spars separately in an autoclave before the secondary bonding operation may reduce product inconsistencies, improve the quality of the airfoil, simplify production processes and reduce manufacturing flow time. Load transfer through the skin-to-spar bonds may be reduced by integrating the spar caps into the spars, and by employing spar caps that are reinforced laminates. The spar caps are substantially aligned with the composite sandwich panel skins. Spar weight is minimized by employing spar webs that are of a honeycomb sandwich construction. Use of composite sandwich panel skins may reduce or eliminate the needs for longitudinal wing stringers, while reducing the number of, or spacing between wing ribs.

According to one disclosed embodiment, an airfoil is provided comprising at least one wing skin panel including an outer wing skin, an inner wing skin and a panel core sandwiched between the inner and outer wing skins, and at least one spar having a spar web and a spar cap, the spar cap having a spar cap core generally aligned and forming a joint with the panel core. The airfoil further includes an adhesive bond joint between the wing skin panel and the spar. The outer wing skin overlaps the joint and is in face-to-face contact with the spar cap. The spar includes an inner facesheet that overlaps the joint, and each of the outer wing skin and the inner facesheet is a fiber reinforced composite resin. The spar web includes a spar web core, and the spar includes a noodle connecting the spar cap core with the spar web core. The noodle is a sheet molding compound. The spar includes inner and outer facesheets, and the spar cap core, the spar web core and the noodle are sandwiched between the inner and outer facesheets. The spar cap core is a substantially solid laminate, and the spar web includes a honeycomb core. The spar includes two C-members arranged back-to-back and respectively have oppositely extending flanges forming the spar cap, and the outer skin overlaps and is in face-to-face contact with the flanges.

According to another disclosed embodiment, an airfoil comprises at least one spar having a web and at least one flange on one end of the web, an outer skin in face-to-face contact with the flange, and a bond joint attaching the spar flange to the outer skin. The flange includes a core having a density sufficient to transmit substantially all of a load placed on the outer skin to the spar web. Each of the spar and the outer skin is a composite, and the spar includes a noodle connecting the flange with the web. The spar includes an inner spar facesheet, an outer spar facesheet, a web core sandwiched between the inner and outer spar facesheets, and wherein the flange core is sandwiched between the inner and outer spar facesheets. The flange core is a substantially solid composite laminate, and the web core is a honeycomb. The spar includes first and second spar members each having substantially C-shaped cross section, and the spar members are joined together back-to-back. The airfoil further comprises an inner wing skin, a wing skin core sandwiched between the outer wing skin and the inner wing skin. The flange core and the wing skin core are substantially aligned with each other and are arranged side-by-side to form a joint, and the outer wing skin overlaps the joint. The spar includes inner and outer facesheets, the web includes a web core, the spar includes a noodle connecting the flange core with the web core, and the flange core, the web core and the noodle are sandwiched between the inner and outer facesheets. The web core has a density less than a density of the flange core.

According to still another embodiment, a precured front composite spar, a precured rear composite spar, at least one procured wing skin panel including an outer wing skin, and adhesive bond joints attaching the precured wing skin panel to each of the front and rear precured composite spars. The wing may further comprise a precured composite leading edge assembly, and the leading edge assembly includes an outer facesheet overlapping and bonded to the precured front composite spar. Each of the precured front spar and the precured rear spar is a sandwich panel construction having an inner spar facesheet and an outer spar facesheet. The wing skin panel is a sandwich construction and includes an inner wing skin. The outer wing skin overlaps and is bonded to the outer spar facesheet, and the inner spar facesheet overlaps and is bonded to the inner wing skin.

According to a further embodiment, a method is provided of fabricating an airfoil. The method comprises assembling and precuring a composite wing skin, assembling and precuring a composite spar, and attaching the composite skin to the composite spar by adhesively bonding the composite skin to composite spar. Assembling the composite spar includes sandwiching a spar web core and a spar cap core between inner and outer composite spar facesheets, and connecting the spar web core with the spar cap core by placing a noodle between spar web core and the spar cap core. Assembling the composite wing skin includes forming composite sandwich by sandwiching a wing skin core between inner and outer composite wing skins, and curing the composite skin sandwich, and bonding the composite wing skin to the composite spar includes bonding each of the inner and outer wing skins facesheets to the composite spars. Attaching the composite wing skin to the composite spar includes forming a joint between the wing skin core and a core of the composite spar, and overlapping the outer wing skin over the joint. Attaching the composite wing skin to the composite spar also includes overlapping an inner composite facesheet of the spar over the joint.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of a flow diagram of aircraft production and service methodology.

FIG. 2 is illustration of a block diagram of an aircraft.

DETAILED DESCRIPTION

Figure 3:
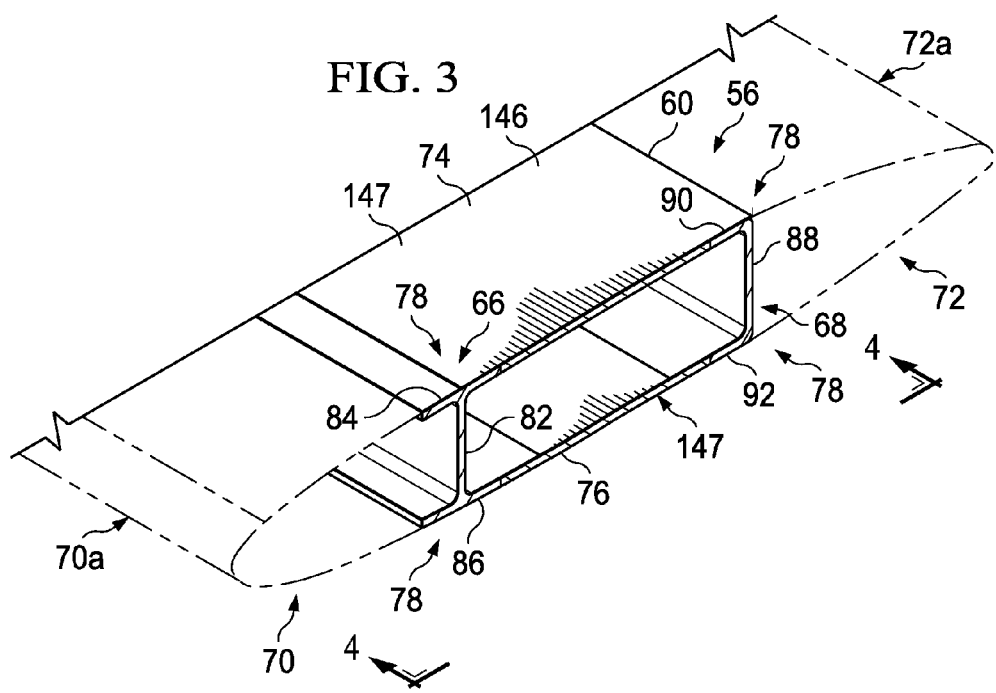
FIG. 3 is an illustration of a perspective cross sectional view of a wing box having wing skin panels bonded to wing spars with integrated caps according to the disclosed embodiments, leading and trailing edge assemblies being indicated in the phantom.

The disclosed embodiments involve a bonded composite airfoil and a related fabrication method. The embodiments may find use in a variety of potential applications, particularly in the transportation industry, including for example, aerospace, marine, automotive applications and other applications where light weight airfoil-like structures are employed. Thus, referring now to FIGS. 1 and 2, embodiments of the disclosure may be used in the context of an aircraft manufacturing and service method 20 as shown in FIG. 1 and an aircraft 22 as shown in FIG. 2. Aircraft applications of the disclosed embodiments may include, for example, without limitation, wings 54, a vertical stabilizer 58 and horizontal stabilizers 60 forming part of the airframe 38, to name only a few. During pre-production, exemplary method 20 may include specification and design 24 of the aircraft 22 and material procurement 26. During production, component and subassembly manufacturing 28 and system integration 30 of the aircraft 22 takes place. Thereafter, the aircraft 22 may go through certification and delivery 32 in order to be placed in service 34. While in service by a customer, the aircraft 22 is scheduled for routine maintenance and service 36, which may also include modification, reconfiguration, refurbishment, and so on.

Each of the processes of method 20 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 22 produced by exemplary method 20 may include an airframe 38 with a plurality of systems 40 and an interior 42. Examples of high-level systems 40 include one or more of a propulsion system 44, an electrical system 46, a hydraulic system 48, and an environmental system 50. Any number of other systems may be included. The airframe 38 may include a fuselage 52, wings 54, a vertical stabilizer 58, horizontal stabilizers 60 and one or more control surfaces 62 such as leading and trailing edge assemblies (not shown). Each of the wings 54 may include a wing box 56, sometimes also referred to as a torque box. The wings 54, stabilizers 58, 60 and control surfaces are covered by skins 64. As used herein in connection with aircraft applications, the term "airfoil" is intended to include, but is not limited to wings 54, vertical stabilizer 58, horizontal stabilizers 60, and control surfaces 62.

Systems and methods embodied herein may be employed during any one or more of the stages of the production and service method 20. For example, components or subassemblies corresponding to production process 28 may be fabricated or manufactured in a manner similar to components or subassemblies produced while the aircraft 22 is in service. Also, one or more apparatus embodiments, method embodiments, or a combination thereof may be utilized during the production stages 28 and 30, for example, by substantially expediting assembly of or reducing the cost of an aircraft 22. Similarly, one or more of apparatus embodiments, method embodiments, or a combination thereof may be utilized while the aircraft 22 is in service, for example and without limitation, to maintenance and service 36.

Figure 4:
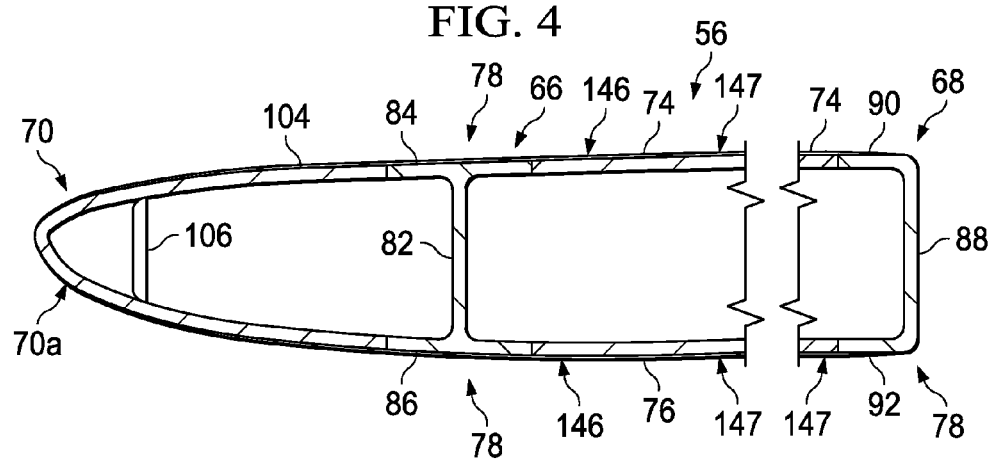
FIG. 4 is a cross sectional view taken in the direction shown as FIG. 4 in FIG. 3, the leading edge shown in full lines but the trailing edge not shown.

Principles of the disclosed embodiments may be employed in connection with the fabrication of a variety of airfoils for various applications. For example, FIGS. 3 and 4 illustrate an airfoil comprising a bonded, panel-stiffened, composite wing box 56 forming part of an airplane wing 54 (FIG. 2). A leading edge assembly 70 having a leading edge 70a may be attached to the front of the wing box 56, and a trailing edge assembly 72 having a trailing edge 72a may be attached to the rear of the wing box 56.

The wing box 56 includes at least a front spar 66 and a rear spar 68. The front spar 66 is generally I-shaped in cross section, and the rear spar 68 is generally C-shaped in cross section, however other cross sectional shapes are possible. The front spar 66 includes a front spar web 82, and upper and lower spar caps 84, 86 that are respectively integrated into the opposite top and bottom ends of the web 82. Similarly, the rear spar 68 includes a rear spar web 88 and upper and lower spar caps 90, 92 that are integrated into the opposite top and bottom ends of the web 88. Depending on the application, the front and/or rear spar 66, 68 may be in the form of other webbed structures, such as, without limitation, "J", "Z" and "T" structures. As will be explained below, each of the spar caps 84, 86, 90, 92 may comprise a single flange or a double flange that may be a reinforced composite resin laminate, depending on the application and particular configuration of the wing box 56.

A top wing skin panel 74 and a bottom wing skin panel 76 cover the wing box 56 and are bonded to the spars 66, 68 at skin-to-spar bonded corner joints 78, thereby reducing or eliminating the need for fastened joints between wing skin panels 74, 76 and the spars 66, 68. The upper spar caps 84, 90 are generally aligned with and integrated into the top wing skin panel 74, and the lower spar caps 86, 92 are generally aligned with and integrated into the lower wing skin panel 76. Although not shown in the drawings, in some embodiments, the wing box 56 may optionally include ribs that are spaced apart in the span-wise direction of the wing box 56 and are adhesively bonded to the spars 66, 68 and/or to the top and bottom wing skin panels 74, 76 respectively.

As will be discussed below in more detail, the top and bottom wing skin panels 74, 76 each include an outer composite wing skin 146 that covers and is bonded to the spars 66, 68, thereby forming a substantially continuous, aerodynamic outer surface 147 on the wing 54 (FIG. 2), which may have a desired outer wing surface contour. The top and bottom wing skin panels 74, 76 are of a sandwich construction, reinforcing the wing box 56 sufficiently such that stringers (not shown) may not be required, and the number of ribs (not shown) needed for a particular application may be reduced. The use of composite sandwich construction for both the wing skin panels 74, 76 and the spars 66, 68 also may reduce part count, complexity and weight.

The top wing skin panel 74 and the bottom wing skin panel 76 may be precured and respectively attached at the bonded corner joints 78 to a precured front spar and a precured rear spar 68 in a secondary bonding operation. Precuring the wing skin panels 74, 76 and the spars 66, 68 separately in an autoclave before the secondary bonding operation may reduce product inconsistencies, improve the quality of the airfoil, simplify production processes and reduce manufacturing flow time. Each of the front and rear spars 66, 68 respectively, and the top and bottom wing skin panels 74, respectively, may be of a composite sandwich panel construction described later in more detail. Top and bottom wing skin panels 74, 76 are respectively bonded to front and rear spars 66, 68 by a layer 80 (FIGS. 5 and 7) of structural adhesive that forms the bonded corner joints 78.

The bonded corner joints 78 may transfer relatively minimal loads between the wing skin panels 74, and the spars 66, 68, including inertial and air loads. Integration of the spar caps 84, 86, 90, 92 into the corresponding spar webs 82, 88 along with use of a reinforced composite resin laminate in the caps 84, 86, 90, 92 may reduce the load transfer through the bonded corner joints 78. Moreover, substantial alignment of the centerlines 159 (see FIGS. 6 and 8) of spar caps 84, 86, 90, 92 with the wing skin panels 74, 76 may enhance efficient load transfer from the outer wing skin 146 to spar webs 82, 88.

A leading edge assembly 70 (FIGS. 4-6) may be attached to the front spar 66, and a trailing edge assembly 72 (FIGS. 3, 8 and 9) having a trailing edge 72a may be attached to the rear spar 68. As best seen in FIG. 4, the leading edge assembly 70 may comprise, without limitation, a composite laminate skin 104 stiffened by a stiffener spar 106 that extends in the spanwise direction of the leading edge assembly 70. It should be noted here that the leading edge assembly 70 shown in the drawings is merely illustrative of a wide range of leading edge configurations that may be employed with the disclosed bonded wing box 56. Other auxiliary boxes, control surfaces or structures (all not shown) may be attached to the wing box 56.

Figure 5:
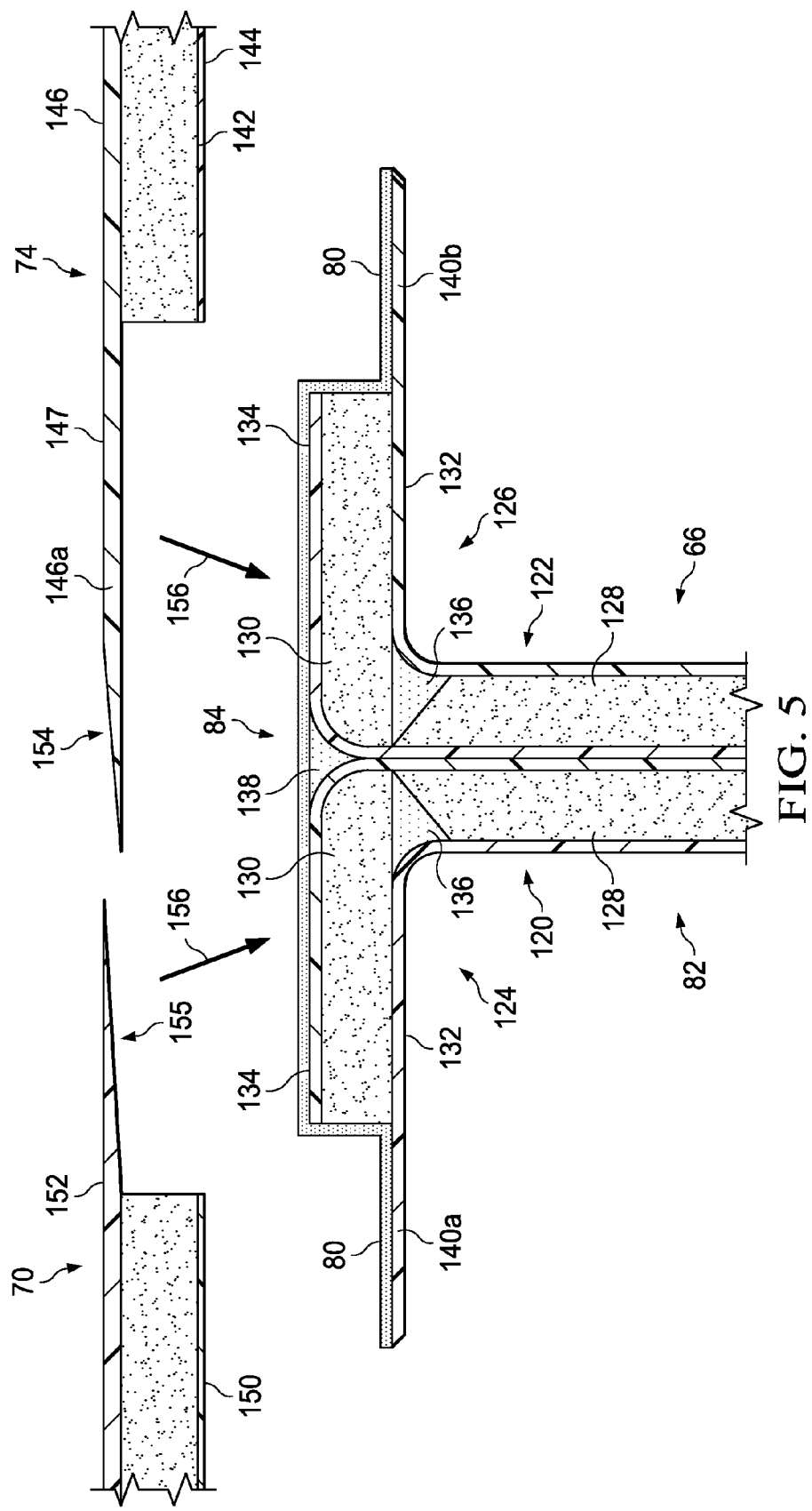
FIG. 5 is an illustration of a cross sectional view showing how the leading edge assembly and the pre-cured top wing skin panel are assembled onto the pre-cured front spar.
Figure 6:
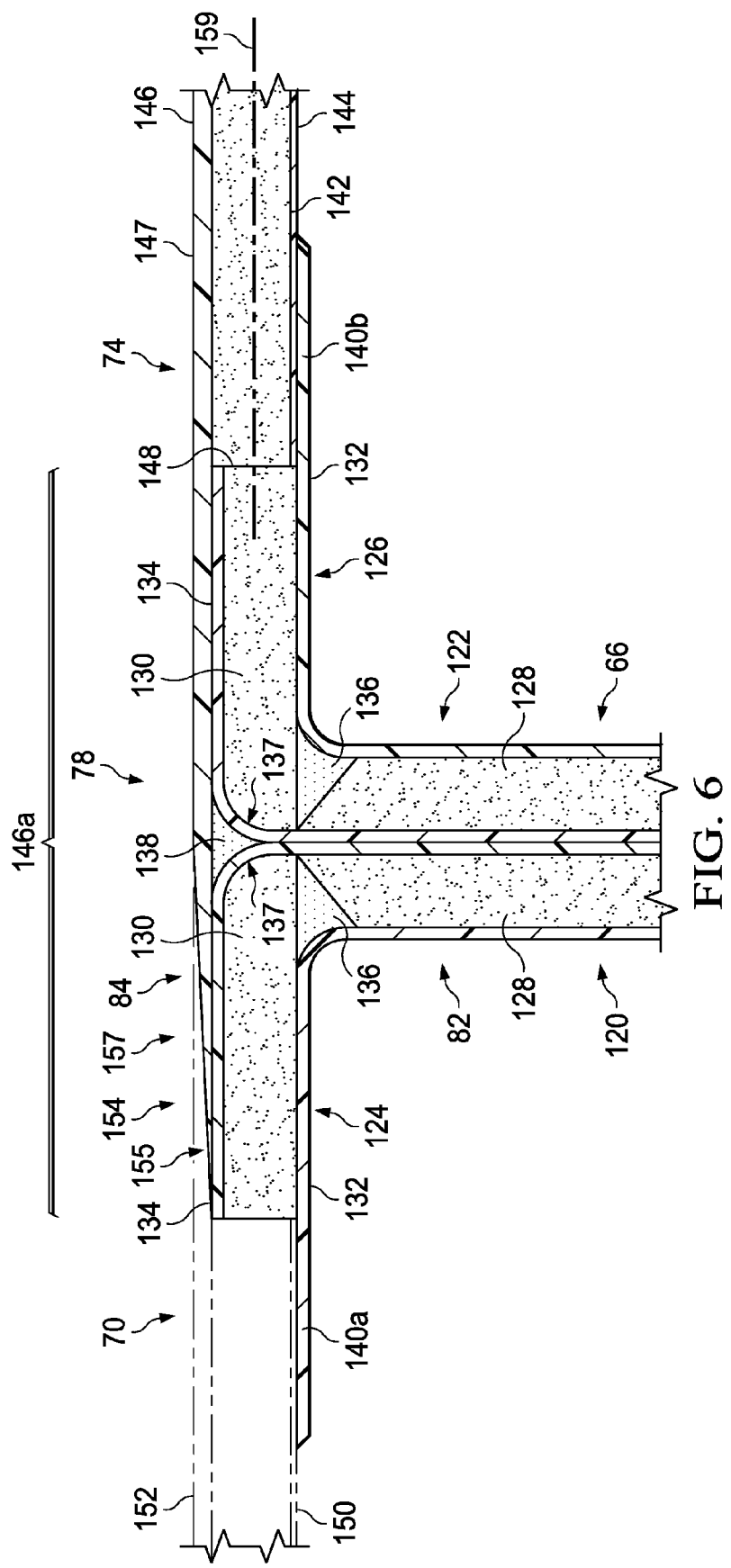
FIG. 6 is an illustration similar to FIG. 5 but showing the components in a fully assembled state.

Attention is now directed to FIGS. 5 and 6, which illustrate additional details of the front spar 66 and the bonded corner joints 78. The front spar 66 broadly includes first and second spar members 120, 122 that are each generally C-shaped in cross section and are arranged back-to-back with each other to form a spar shape that is substantially I-shaped in cross section. The upper and lower front spar caps 84, 86 (FIGS. 3 and 4) each includes a pair of flanges 124, 126 respectively extending forward and aft which are generally aligned and integrated with the wing skin panels 74, 76.

FIG. 5 illustrates a leading edge assembly 70 and a top skin panel 74 being loaded onto the front spar 66 in preparation for a bonding operation. A layer 80 of a suitable structural adhesive such as an adhesive paste is applied between the mating surfaces of the spar 66, the leading edge assembly 70 and the top skin panel 74. In the example shown in FIG. 5, the adhesive layer 80 has been applied to the front spar 66, however in other embodiments, the layer 80 of structural adhesive may be instead applied to the leading edge assembly 70 and to the top skin panel 74, or to each of the front spar 66, the leading edge assembly 70 and the top skin panel 74.

As will be discussed below, the leading edge assembly 70, the top wing skin panel 74 and the front spar 66 may all be fully cured before they are assembled together (shown by the arrows 156) and adhesively bonded. The assembly process may be carried out by placing the front spar 66 in a suitable alignment and holding fixture (not shown) and then applying the adhesive layer 80, followed by placement of the leading edge assembly 70 and the top wing skin panel 74 onto the front spar 66. Alternate assembly techniques and orders of assembly may be possible. Following the assembly process, the layer of bonding adhesive may be thermally cured by processing the wing box 56 in an autoclave. Other cure techniques, such as out-of-autoclave or oven processing, may be possible, depending on the type of bonding adhesive used.

Each of the spar members 120, 122 is a sandwich panel construction in which a spar web core 128 and a spar cap core 130 are sandwiched between inner and outer composite spar facesheets 132, 134 respectively. Each of the inner and outer spar facesheets 132, 134 may comprise a composite laminate such as multi-ply, fiber reinforced composite resin, formed from a unidirectional prepreg in which the plies have multiple fiber orientations chosen to optimize performance. The spar cap cores 130 which respectively form part of the front spar flanges 124, 126, may each comprise a solid, fiber reinforced composite resin laminate, sometimes referred to as a "densepack", although other spar cap core materials exhibiting the required strength and rigidity may be possible. As will be discussed below, the solid, fiber reinforced composite resin laminate spar flanges 124, 126 are precured and then co-bonded to inner and outer spar facesheets 132, 134 in a "green" state before the front spar 66 is cured.

The spar web cores 128 may each comprise a suitable lightweight honeycomb construction, which may or may not be filled or "potted" with a suitable material, although other types of lightweight cores may be possible. The spar web cores 128 may have a density that is less than that of the spar cap cores 130 in order to reduce the overall weight of the spar 66, however, in some applications, the spar web cores 128 may have a density that is equal to or greater than that of the spar cap cores 130. Generally, the density of the spar cap cores 130 is sufficiently high such that spar caps 84, 86 are able to transfer substantial loads from the outer wing skins 146 to the spar web 82, and limit the amount loading transferred through the bonded corner joints 78 to shear loads transferred to the bonded corner joints from the inner and outer skins 144, 146.

Because the spar cap cores 130 and the spar web cores 128 may be made from differing materials, e.g. a laminate and a honeycomb respectively, a void may be present between these two cores 128, 130 which may be filled with a noodle 136 that may comprise layers of a structural adhesive, a multi-ply prepreg or other suitable filler materials and assists in connecting and integrating the two core 128, 130 with each other. In one embodiment, the noodle 136 may comprise a sheet molding compound in order to reduce the axial stiffness. Similarly, a void may be present between adjacent radiused corners 137 of the flanges 124, 126 that may be filled with a noodle 138 which may comprise layers of a structural adhesive, a multi-ply prepreg, a sheet molding compound or other suitable fillers. The inner spar facesheets 132 extend outwardly beyond the corresponding spar cap cores 130 to form forward and aft spar facesheet lips 140a, 140b, respectively which overlap the bottom of the spar cores 30. Similarly, a portion 146a of the outer wing skin 146 overlaps the top of the cores 130. The top and bottom overlap of the cores 130 by fiberous reinforcements in the outer wing skin 146 and the spar facesheet lips 140a, 140b assist in structurally stabilizing the spar cap cores 130.

As will be discussed in more detail below, the spar members 120, 122 are assembled in a green or uncured state, back-to-back, along with the noodle 136 and then fully cured to form a fully assembled pre-cured front spar 66 before being bonded to the top and bottom wing skin panels 74, 76. Each of the top and bottom wing skin panels 74, 76 comprises a skin core 142 sandwiched between inner and outer composite wing skins 144, 146. Each of the inner and outer composite wing skins 144, 146 may comprise a composite laminate such as multi-ply, fiber reinforced composite resin formed of unidirectional prepreg in which the plies have multiple fiber orientations chosen to optimize performance. The wing skin core 142 may comprise a honeycomb construction and may be contoured along with the outer composite wing skin 146 to form an outer surface 147 having a desired wing contour. A portion 146a of the outer wing skin 146 extends beyond the wing skin core 142 and overlaps and covers substantially the entire length of the front spar cap 84. The leading edge of the outer wing skin is tapered at 154. The outer wing skin portion 146a is adhesively bonded to the outer spar facesheets 134 and to the noodle 138. The sandwich construction of the wing skin panels 74, 76 employing a honeycomb core 142 as described above may result in a wing skin that has sufficient strength and rigidity such that skin stiffeners or reinforcements, such as stringers (not shown) may not be required, or such that the number of stiffeners required for a given application is substantially reduced.

The spar cap core 130 of spar member 122 is aligned side-by-side with and abuts adjacent wing skin panel core 142, forming a joint 148 (FIG. 6) between the spar cap 84 and the wing skin panel 74 that is overlapped on the top by the outer wing skin 146 and on the bottom by a rearwardly extending lip 140 of one of the inner facesheets 132. Although the joint 148 shown in FIG. 6 is a butt joint, other types of joint configurations are possible, such as, for example and without limitation, a scarf joint, a lap joint or a step lap joint. The outer spar facesheets 134 are in face-to-face contact with the outer wing skin 146, and the inner spar facesheets 132 are in face-to-face contact with the inner wing skin 144. The forward spar facesheet lip 140a overlaps and is adhesively bonded to the inner facesheet 150 of the leading edge assembly 70, and the rear spar inner facesheet lip 140b is adhesively bonded to the inner skin 144 of the wing skin panel 74. The outer facesheet 152 of the leading edge assembly 70 is tapered at 155 to substantially match and overlap the taper 154 of the outer wing skin 146, and together form a tapered lap joint at 157. The outer leading edge facesheet 152 may be adhesively bonded to the outer wing skin 146 along the lap joint 157. The bonded attachment of the bottom wing skin panel 76 (FIGS. 3 and 4) to the front spar 66 may be substantially the same in detail as the attachment of the top wing skin panel 74 to the front spar 66 described above.

Figure 6A:
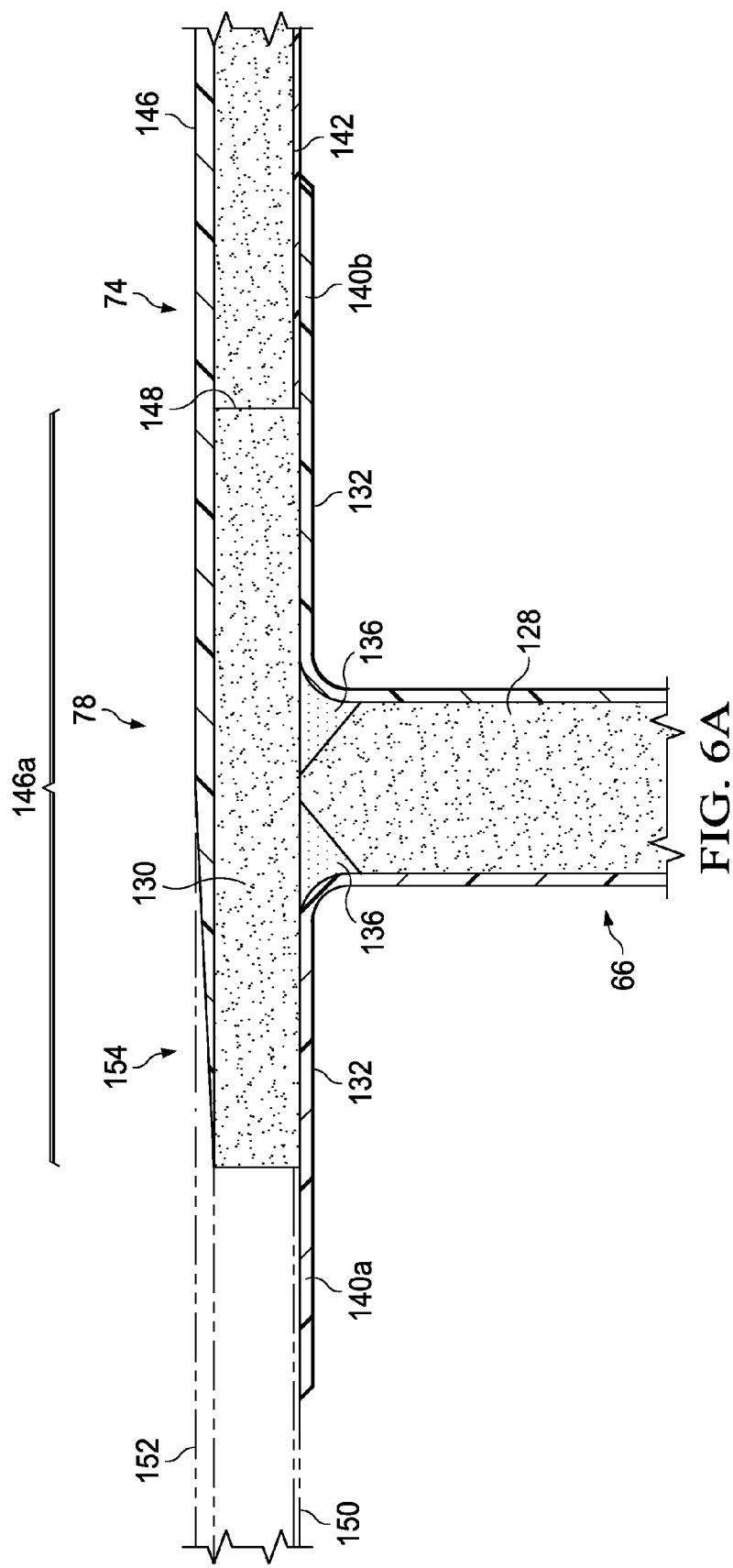
FIG. 6A is an illustration similar to FIG. 6, but showing an alternate embodiment employing spar having a single cap core and a single web core.

FIG. 6A illustrates an alternate embodiment of the front spar 66 having a single spar web core 128 sandwiched between facesheet 132 and a single spar cap core 130. In this example, the spar cap core 130 is attached directly to the overlapping outer facesheet 146 of the wing skin panel 74. Thus, the need for the outer facesheet 134 of the embodiment of FIG. 6 is obviated. Noodles 136 may be used to assist in connecting the spar cap core 130 to the spar web core 128.

Figure 6B:
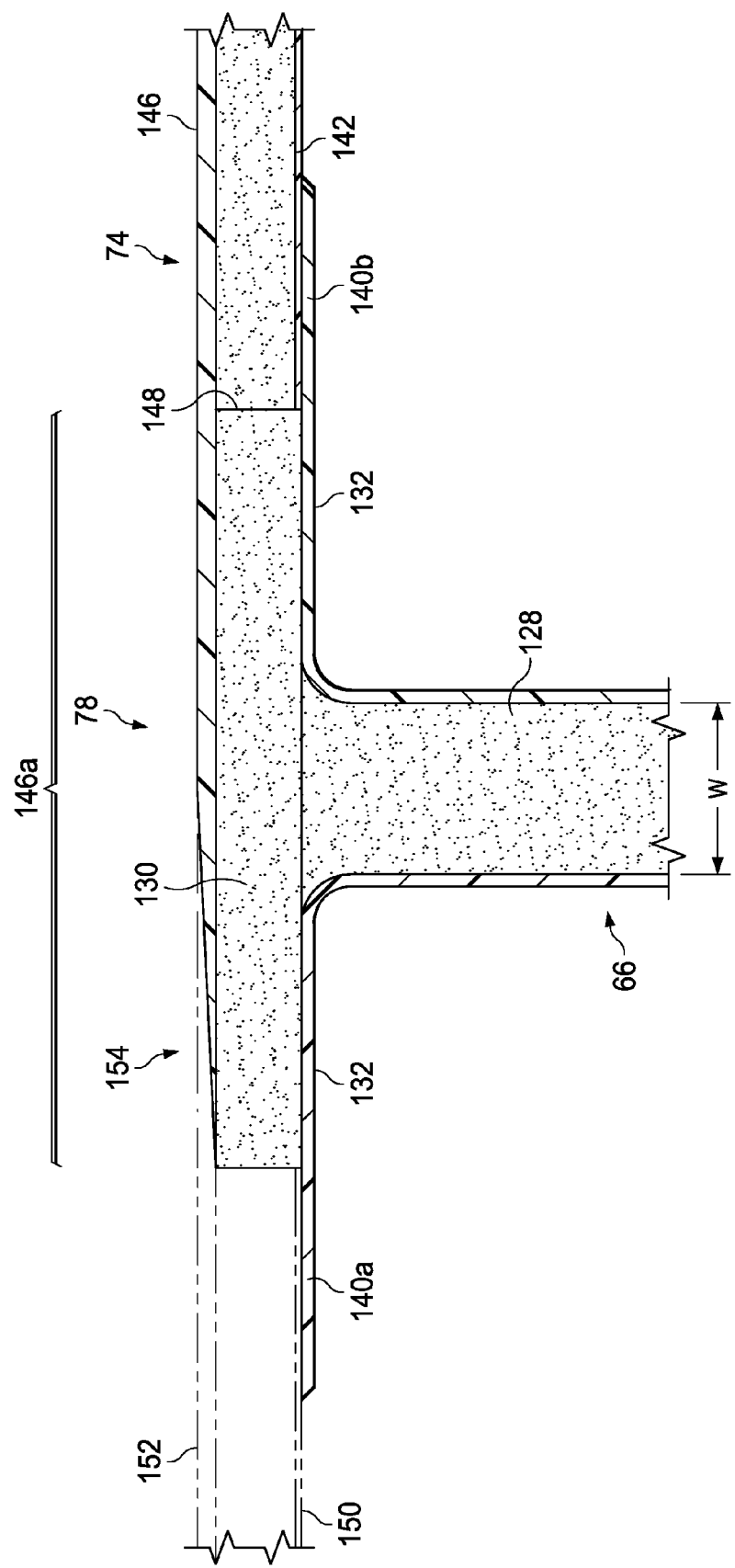
FIG. 6B is an illustration similar to FIG. 6A, but showing another embodiment in which the web core is attached directly to the cap core.

FIG. 6B illustrates a further embodiment of the front spar 66 that is similar to the embodiment shown in FIG. 6A, but does not employ noodles 136 to connect the spar web core 128 with the spar cap core 130. Rather, in this example, the spar cap core 130 is attached directly to the spar web core 128, across substantially the entire width W of the spar web core 128.

Figure 7:
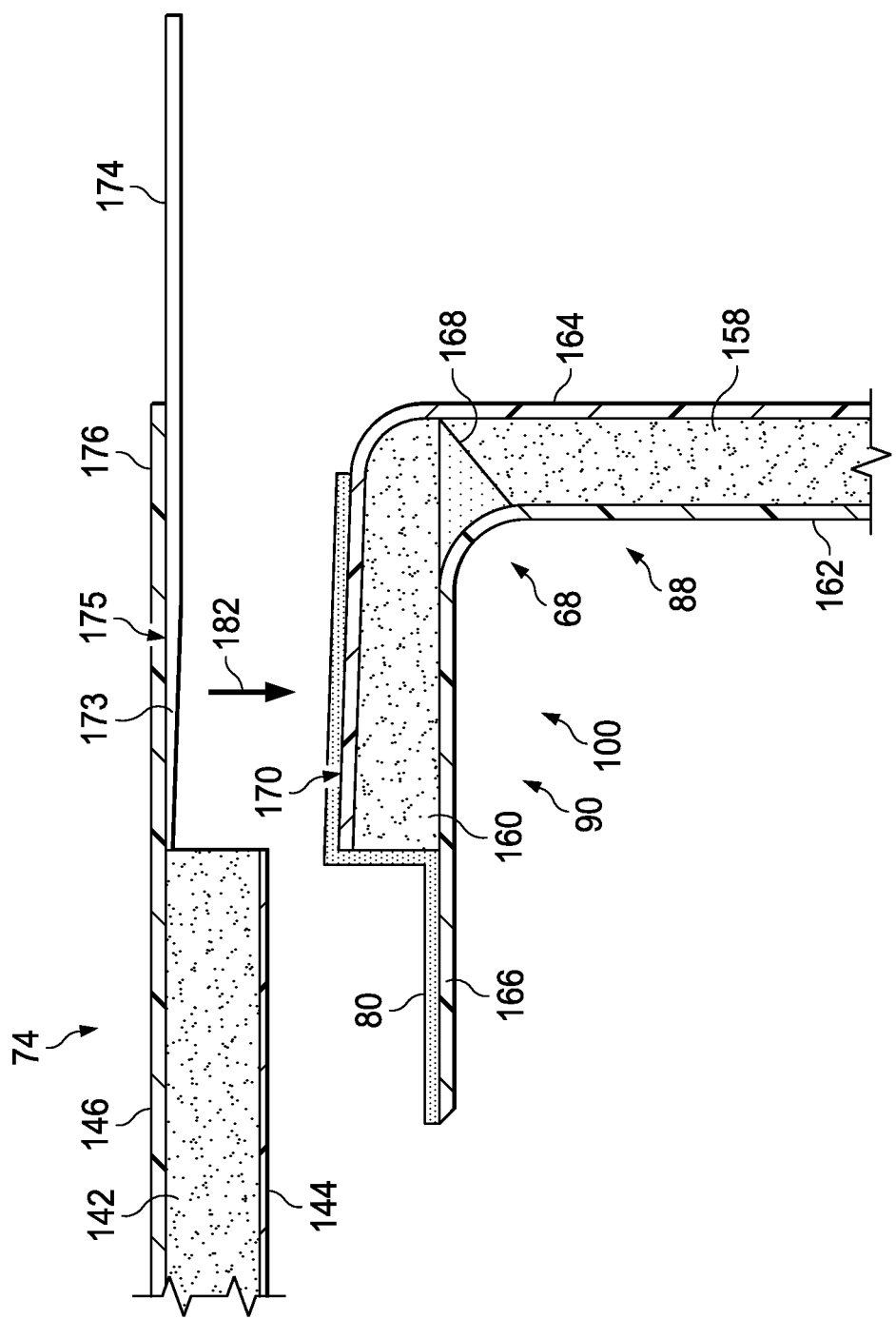
FIG. 7 is an illustration showing the top wing skin panel being loaded onto the rear spar during the assembly process.
Figure 8:
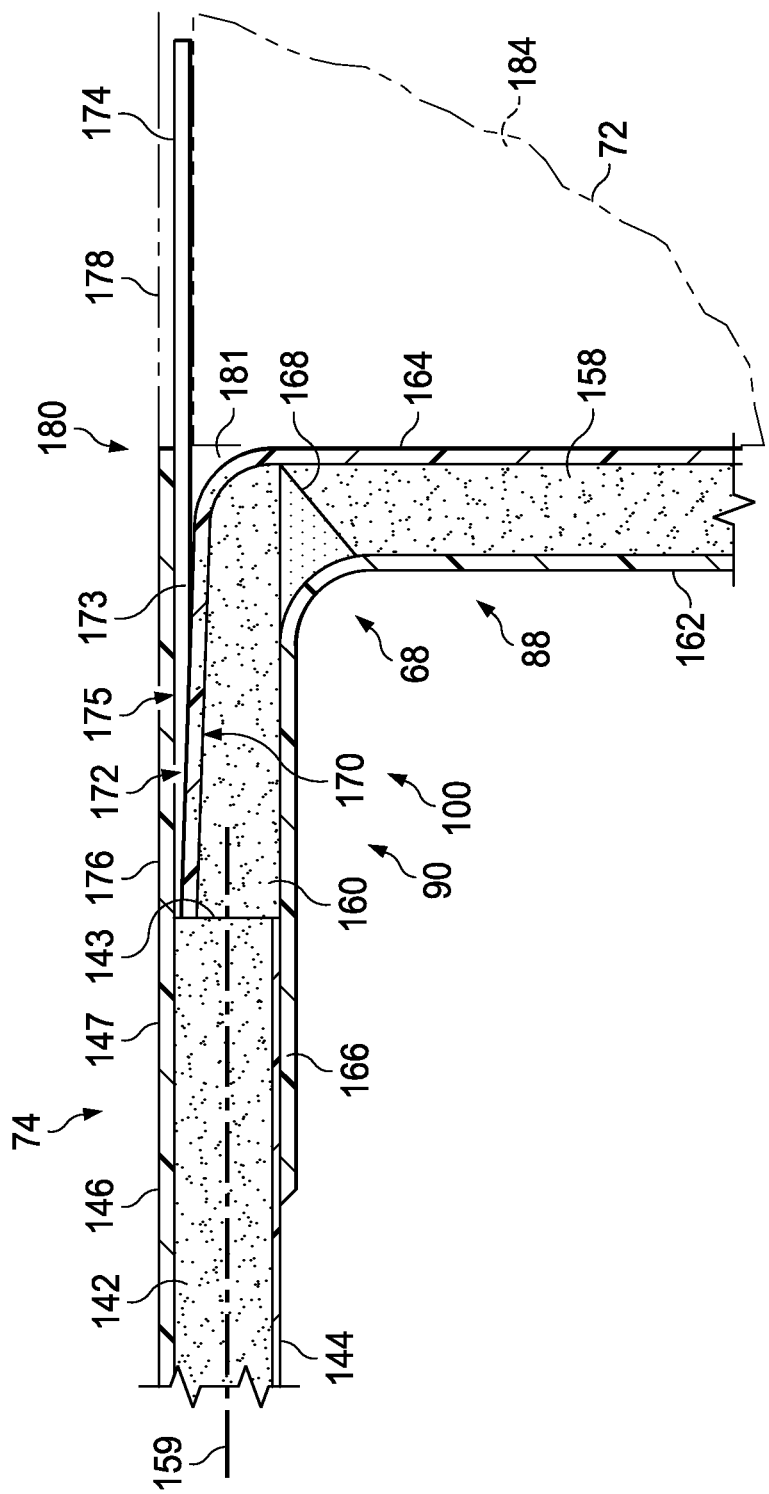
FIG. 8 is an illustration similar to FIG. 7 but showing the components in a fully assembled state, the trailing edge assembly being indicated in the phantom.

Attention is now directed to FIGS. 3, 7 and 8 which illustrate additional details of the rear spar 68. FIG. 7 illustrates top wing skin panel 74 being assembled 182 onto the rear spar 68. In preparation for the assembly process, the trailing edge doubler 174 is bonded to the rearwardly extending lip 176 of the outer wing skin 146, following which, a layer 80 of bonding adhesive may be applied to either or both of the mating surfaces of the top skin panel 74 and/or the rear spar 68. The layer 80 of bonding adhesive having been applied to the mating surfaces, the top wing skin panel 74 including the trailing edge doubler 174 may be placed 182 onto the rear spar 68. Following these assembly steps, the layer 80 of adhesive may be thermally cured by placing the wing box in an oven at elevated temperatures. Other curing processes are possible. It should be noted here that it may be possible to bond the trailing edge doubler 174 directly to the outer spar facesheet 164 before placing the top wing skin panel 74 on the rear spar 68.

Referring particularly now to FIG. 8, the upper and lower caps 90, 92 of the rear spar 68 respectively comprise forwardly extending single flanges 100, 102 which are integral with the web 88. The rear spar 68 is a sandwich panel construction, generally similar to the front spar 66, and comprises a spar web core 158 and a spar cap core 160 sandwiched between inner and outer spar facesheets 162, 164. Each of the inner and outer spar facesheets 162, 164 may comprise a composite laminate such as a multi-ply, fiber reinforced composite resin, formed by a unidirectional prepreg in which the plies have multiple fiber orientations chosen to optimize performance.

Spar web core 158 may be a honeycomb, similar to the front spar web cores 128 previously discussed. The spar cap core 160, which forms the flange 100 on the rear spar 68, may be a solid laminate densepack construction, similar to the spar cap cores 130 previously discussed, that is integrated with the spar web core 158 between the inner and outer spar facesheets 162, 164.

The spar web core 158 may have a relatively low density compared to the density of the spar cap core 160 in order to reduce the overall weight of the rear spar 68, however, in some applications, the spar web core 158 may have a density that is equal to or greater than that of the spar cap cores 160. Generally, the density of the spar cap core 160 is sufficiently high such that spar caps 90, 92 are able to transfer substantial loads from the outer wing skins 146 to the spar web 82, and reduce the loads that are required to be transferred through the bonded corner joints 78. In fact, the configuration of the front and rear spars 66, 68 disclosed herein substantially reduces or nearly eliminates transfer of spar crushing loads through the secondary bonds at the corner joints 78; only relatively small loads are transferred through the secondary bonds at the corner joints 78. Because the rear spar cap cores 160 and the rear spar web cores 158 may be made from differing materials, e.g. a laminate and a honeycomb respectively, a void may be present between these two cores 160, 158 which may be filled with a noodle 168 that may comprise layers of a structural adhesive, a multi-ply prepreg or other suitable filler materials, which assists in integrating the spar cap core 160 with the spar web core 158.

The spar cap core 160 of the rear spar 68 is aligned side-by-side with and abuts adjacent wing skin panel core 142, forming a joint 143 (FIG. 7) between the spar cap core 160 and the wing skin panel core 142 that is overlapped on the top by the outer wing skin 146 and on the bottom by a forwardly extending lip 166 forming an extension of the inner spar facesheet 162. The outer spar facesheet 164 is in face-to-face contact with the trailing edge doubler 174, and the inner spar facesheet 162 is in face-to-face contact with the inner wing skin 144. The lip 166 is adhesively bonded to the inner wing skin facesheet 144. The spar cap core 160 may be slightly tapered at 170 to form a scarf joint 172 between the spar cap core 160 and an overlapping tapered end 173 of composite trailing edge doubler 174. A rearwardly extending lip 176 of the outer skin 146 covers substantially the entire area of the rear spar 68. Lip 176 overlaps and is bonded to the trailing edge doubler 174 to form a lap joint 175 (FIG. 8) that overlies the scarf joint 172. The top and bottom overlap of the cap core 160 by fiberous reinforcements in the outer wing skin 146 and in the inner spar facesheet 162 assist in structurally stabilizing the spar cap core 160.

As shown in FIG. 8, the trailing edge doubler 174 extends rearwardly beyond the rear spar 68 and overlies ribs 184 which form part of, and internally stiffens the trailing edge assembly 72 shown in FIG. 3. Although not illustrated in the drawings, a suitable filler may be placed in a void 181 which may be present between the trailing edge doubler 174, the ribs 184 and the rear spar 68. The ribs 184 may be bolted or otherwise secured to the rear spar 68. The trailing edge assembly 72 (FIG. 3) includes a facesheet 178 (shown in the phantom) that overlies the ribs 184 and may extend to the trailing edge 72a of the trailing edge assembly 72. The facesheet 178 abuts the outer skin 146 at 180 and is substantially flush with the outer skin 146, forming a rearward extension of the aerodynamic outer surface 147. While FIG. 8 illustrates attachment of only the top of the rear spar 68 to the top wing skin panel 74, attachment of the bottom of the rear spar 68 to the bottom wing skin panel 76 (FIGS. 3 and 4) may be similar in detail.

Figure 9:
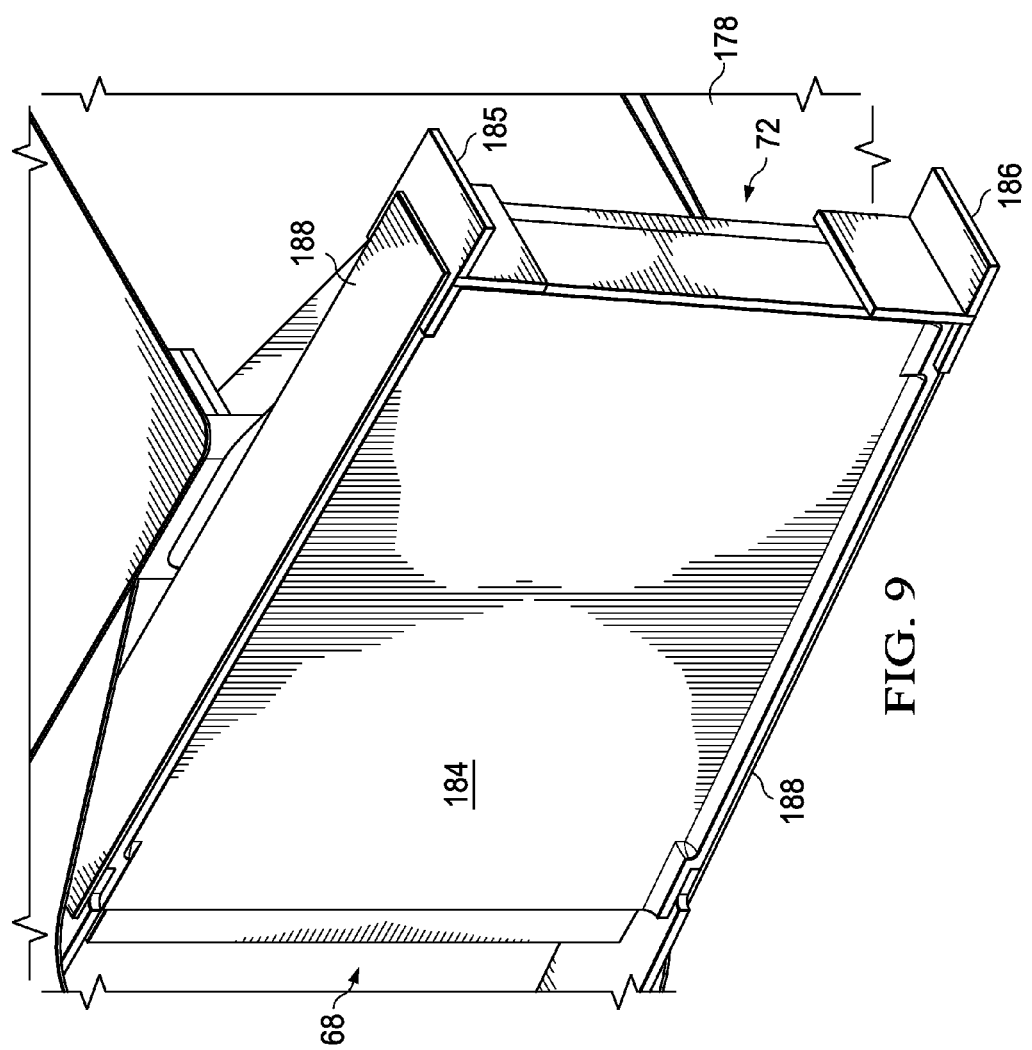
FIG. 9 is an illustration of a perspective view showing components of the trailing edge assembly attached to a wing box.

FIG. 9 illustrates typical internal components of one example of a trailing edge assembly 72 (FIG. 3) that may be bolted or otherwise affixed to the rear spar 68. The trailing edge assembly 72 may include a plurality of spaced apart ribs 184 described previously in connection with FIG. 7, secured to the rear spar 68, along with beams 185, 186 that are covered by panels 188. Facesheets 178 cover the panels 188.

Figure 10:
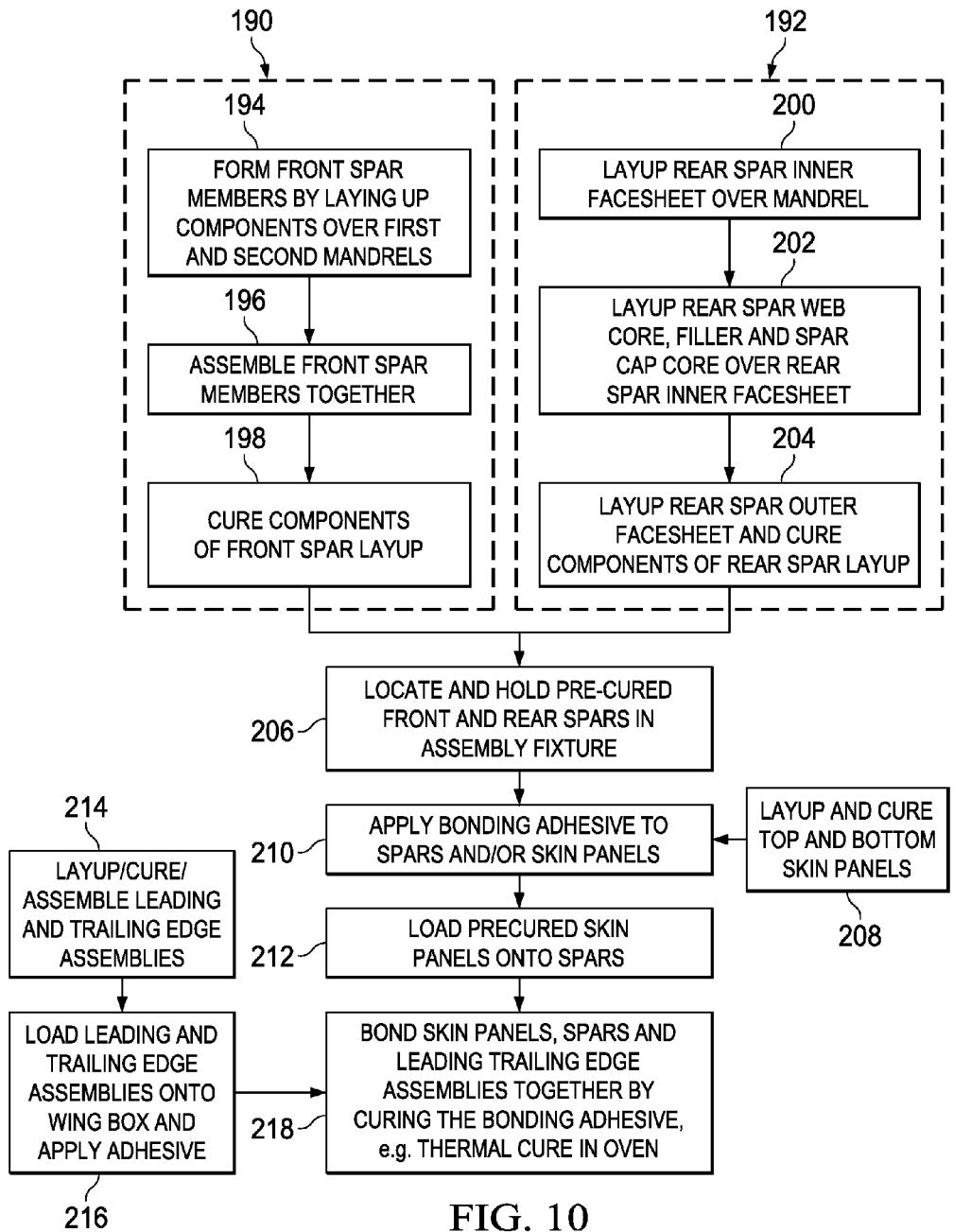
FIG. 10 is an illustration of a flow diagram of a method of fabricating a bonded composite airfoil.

Attention is now directed to FIG. 10 which broadly illustrates the steps of a method of fabricating a bonded composite airfoil, such as the wing box 56 previously described. The fabrication method begins with fabricating, assembling and pre-curing components of both the front spar 66 and the rear spar 68, as broadly indicated by the numerals 190, 192 respectively. The process of fabricating the front spar 66 at 190 begins at step 194 in which the components of the two spar members 120, 122 of the front spar 66 are respectively laid up over suitable first and second layup mandrels (not shown). This layup process includes, for each of the spar members 120, 122, laying up the inner spar facesheet 132, a precured spar web core 128, a precured spar cap core 130 and the noodle 136 over the inner spar facesheet 132, followed by layup of the outer spar facesheet 134.

As previously mentioned, the noodle 136 placed between the spar web core 128 and the spar cap core 130 fills a void and assists in connecting the two core 128, 130 to each other and to the inner spar facesheet 132. Next, at 196, the spar members 120, 122 are assembled together as two back-to-back "C's", that together form an "I". The noodle 138 is also installed to assist in connecting the two spar members 120, 122 and to provide additional surface area to which the outer wing skin 146 and facesheets 134 may be bonded. Then, at 198, the components of the front spar 66 layup are cured. Curing of the front spar layup may be performed in an autoclave (not shown).

The rear spar 68 is fabricated at 192 by a process beginning at step 200 in which the rear spar inner facesheet 162 is laid up over a suitable layup mandrel (not shown). Then, at 202, the rear spar web core 158, a precured densepack (composite laminate) spar cap core 160 and noodle 168 are laid up over inner spar facesheet 162. The noodle 168 placed between the spar web core 158 and the spar cap core 160 to fill a void between the two cores 158, 160 and to assist in connecting them together and to the rear spar inner facesheet 162. The spar cap core 160 may be tapered at 170 (FIG. 8) to substantially match the tapered end 173 of the trailing edge doubler 174. Finally, at 204, the outer spar facesheet 164 is laid up following which the components of the rear spar 68 layup are cured to form a "C" shape. Curing of the rear spar layup may be carried out in an autoclave (not shown).

At step 206, the fully fabricated and precured front and rear spars 66, 68 are located and held in a suitable assembly fixture (not shown). At 208, the top and bottom wing skin panels 74, 76 respectively, are laid up and cured. As the wing skin panels 74, 76 are being laid up, the portions 146a of the outer skin 146 of the wing skins panel 74 that are to overlap the spars 66, 68 are tapered 154 (FIGS. 5 and 6). This tapering may be achieved, for example and without limitation, using ply drop-offs when the outer wing skin 146 is being laid up. Also during step 208, trailing edge doubler 174 may be adhesively bonded to the lip 176 of the outer skin of the wing skin panels 74, 76, forming the lap joint 175 shown in FIG. 7. Alternatively, the trailing edge doubler 174 may be bonded to the spar cap 90 before the wing skin panels 74, 76 are loaded onto the front and rear 66, 68 in step 212 discussed below. Next at 210, a layer 80 of bonding adhesive is applied to the front and rear spars 66, 68 and/or to the top and bottom wing skin panels 74, 76, respectively.

At 212, the pre-cured top and bottom wing skin panels 74, 76 are loaded onto the pre-cured front and rear spars 66, 68 while the latter are held in the assembly fixture. During the assembly process in step 212, the wing skin panel cores 142 are brought into aligned, side-by-side abutment with the caps cores 130, 160, and the outer wing skins 146 are brought into face-to-face contact with the front spar caps 84, 86 and with the rear spar caps 90, 92. In effect, the spar caps 84, 86, 90, 92 are integrated within the wing skin panels 74, 76, with the front spar caps 84, 86 being sandwiched between the inner spar facesheets 132 and the outer skin 146, and the rear spar caps 90, 92 being sandwiched between the inner spar facesheets 162 and the outer skins 146.

The leading and trailing edge assemblies 70, 72 are laid up, cured and assembled at 214. The layup process in step 214 may include tapering 155 (FIGS. 5 and 6) the outer facesheets 152 of the leading edge assembly 70 to match the taper 154 of the outer skins 146 of the wing skin panels 74, 76. Step 214 may also include tapering an outer end 174 of the trailing edge doubler 174 (FIG. 7) to substantially match the taper 179 of the rear spar cap core 160. At 216, the assembled leading and trailing edge assemblies 70, 72 are loaded onto the assembled wing box 56, and a layer of adhesive is applied to between the interfacing surfaces between the wing box 56 and the leading and trailing edge assemblies 70, 72. During the assembly process in step 216, the tapered lap joint 157 is formed between the tapered edge 155 of the outer facesheet 152 of the leading edge assembly 70 and the tapered leading edge 154 of the outer skin 146 of the wing skin panel 74.

Finally, at 218, the precured wing skin panels 74, 76, the leading and trailing edge assemblies 70, 72 and front and rear spars 66, 68 are bonded together by curing the layers of adhesive. Curing of the layers of adhesive may be carried out, for example, by a thermal cure process in an oven. Although not shown in FIG. 10, in an alternate embodiment, the leading and trailing edge assemblies 70, 72 may be bonded to a completed wing box in a separate assembly and bonding operation. For example, the wing skin panels 74, 76 and the front and rear spars 66, 68 may be assembled and bonded together and then cured to form an a substantially completed wing box 56, following which the assembled leading and trailing edge assemblies 70, 72 may be bonded to the wing box 56. In still other embodiments, depending on the configuration of the joints between outer skins 146 of the wing skin panels 74, 76 and the leading and trailing edge assemblies 70, 72, it may be possible to assemble and attach the leading and trailing edge assemblies 70, 72 to the front and rear spars 66, 68, following which the top and bottom wings skin panels 74, 76 may be loaded onto and then bonded to the pre-cured front and rear spars 66, 68.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An airfoil, comprising:
at least one wing skin panel including an outer wing skin, an inner wing skin and a panel core sandwiched between the inner and outer wing skins;
at least one spar having a spar web and a spar cap, the spar cap having a spar cap core substantially horizontally aligned with the panel core and forming a joint with the panel core; and
an adhesive bond joint between the wing skin panel and the spar.

2. The airfoil of claim 1, wherein the outer wing skin overlaps the joint and is in face-to-face contact with the spar cap.

3. The airfoil of claim 1, wherein the spar includes an inner facesheet that overlaps the joint.

4. The airfoil of claim 3, wherein each of the outer wing skin and the inner facesheet is a fiber reinforced composite resin.

5. The airfoil of claim 1, wherein:
the spar web includes a spar web core, and
the spar includes a noodle connecting the spar cap core with the spar web core.

6. The airfoil of claim 5, wherein the noodle is a sheet molding compound.

7. The airfoil of claim 6, wherein:
the spar includes inner and outer facesheets, and
the spar cap core, the spar web core and the noodle are sandwiched between the inner and outer facesheets.

8. The airfoil of claim 1, wherein:
the spar cap core is a substantially solid laminate and abuts the panel core, and
the spar web includes a honeycomb core.

9. The airfoil of claim 1, wherein the spar includes:
two C-members arranged back-to-back and respectively have oppositely extending flanges forming the spar cap, and
the outer skin overlaps and is in face-to-face contact with the flanges.

10. An airfoil, comprising:
at least one spar having a spar web and at least one composite spar flange on one end of the web;
an outer layer of a sandwich-structured composite wing skin in face-to-face contact with the composite spar flange; and
a bond joint attaching the composite spar flange to the outer layer,
wherein the composite spar flange includes a flange core having a density sufficient to transmit substantially all of a load placed on an outer wing skin to the spar web.

11. The airfoil of claim 10, wherein:
the spar is a composite, and
the spar includes a noodle connecting the flange with the web.

12. The airfoil of claim 11, wherein the spar includes:
an inner spar facesheet,
an outer spar facesheet,
a web core sandwiched between the inner and outer spar facesheets, and
wherein the flange core is sandwiched between the inner and outer spar facesheets.

13. The airfoil of claim 12, wherein the flange core is a substantially solid composite laminate, and the web core is a honeycomb.

14. The airfoil of claim 10, wherein:

the spar includes first and second spar members each having substantially C-shaped cross section, and the spar members are joined together back-to-back.

15. The airfoil of claim 10, further comprising:

an inner wing skin, a wing skin core sandwiched between the outer wing skin and the inner wing skin, and wherein the flange core and the wing skin core are substantially aligned with each other and are arranged side-by-side to form a joint, and the outer wing skin overlaps the joint.

16. The airfoil of claim 10, wherein the spar includes:

inner and outer facesheets, the web includes a web core, the spar includes a noodle connecting the flange core with the web core, and the flange core, the web core and the noodle are sandwiched between the inner and outer facesheets.

17. The airfoil of claim 16, wherein the web core has a density less than a density of the flange core.

\* \* \* \* \*